J. K. HOYER.
Meat Cutter.
No. 21,421.
Patented Sept. 7, 1858.
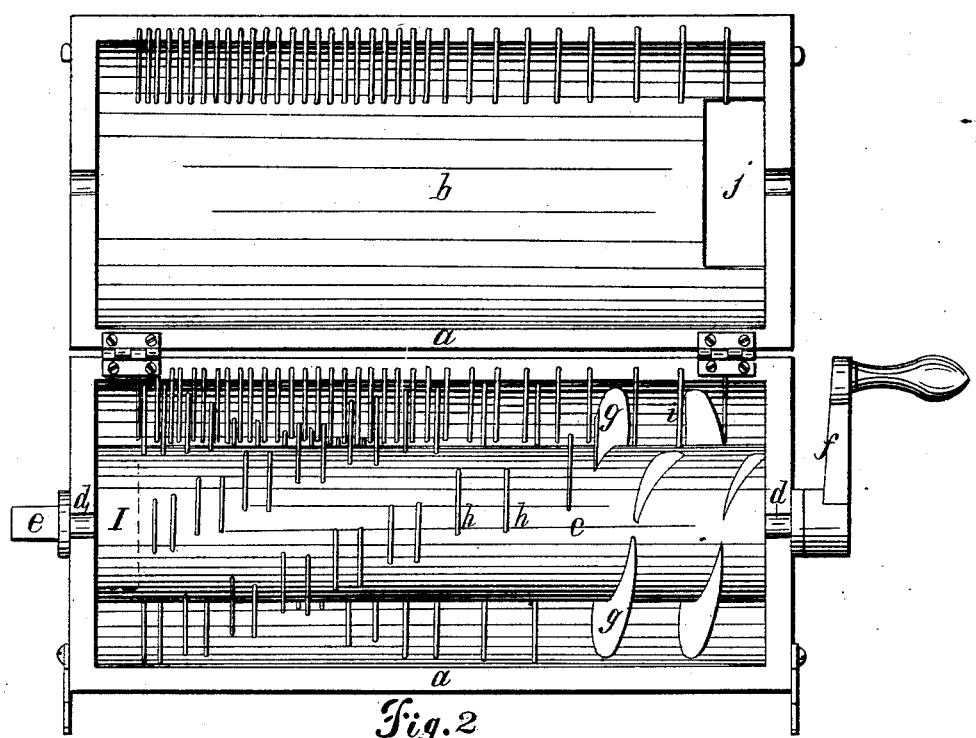
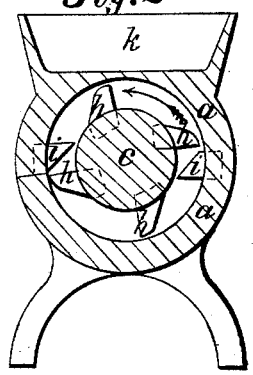

UNITED STATES PATENT OFFICE.

JACOB K. HOYER, OF READING, PENNSYLVANIA.

IMPROVED MEAT-CUTTER.

Specification forming part of Letters Patent No. 21,421, dated September 7, 1858.

*To all whom it may concern:*

Be it known that I, JACOB K. HOYER, of the city of Reading, county of Berks, and State of Pennsylvania, have invented certain Improvements in a Sausage-Machine; and I do hereby declare that the following is a full and exact description thereof, reference being had to the accompanying drawings, and to the letters of reference marked thereon, in which—

Figure 1 is a plan view, and Fig. 2 is a transverse section thereof, the letters having reference to both views.

The box $a$ is formed in two parts connected by hinges, and each part contains a semi-cylindrical concave $b\ b$. The two concaves, as represented in Fig. 2, when closed form a hollow cylinder, in which a solid cylinder $c$ is placed, the shaft $e$ of which passes through the cylinder $c$, and has bearings $d\ d$ in the ends of the box. The extreme ends of the shaft $e$ are square, to which the cranks are attached, as represented at $f$.

$g\ g$ are screw-knives set in an inclined position on the periphery of the solid cylinder $c$, and are furnished with straight and round edges, which causes the meat to be cut and propelled to knives $h\ h$, which are placed in pairs of two and two in spiral rows, with the edges tending to the center of the cylinder $c$ and graduating closer toward the discharge end of the machine.

$i\ i$ are stationary knives, all parallel with each other, placed in the top and bottom parts of the box, and graduating the same as knives $h\ h$ on the cylinder $c$, which work through between them. The edges of the knives $i\ i$ are slanting, as represented in Fig. 2, which causes knives $h\ h$ to operate the same as shears, thereby requiring much less power in operating than other machines.

$j$ is an opening through the top part of box $b$, into which the meat is put from hopper $k$.

$l$ is the discharge-opening, represented in dotted lines.

The meat is placed into the hopper $k$ through the opening $j$, and motion is given to crank $f$. The meat is cut and propelled through the machine by means of the spiral arrangement of knives $h\ h$, and consequently the meat is subject to the action of each knife, and when it arrives at the opening $l$ it will be cut perfectly fine.

I am aware that screw-knives setting in a spiral position on the periphery of the revolving cylinder and forming a screw-feed have been heretofore used. I therefore do not claim that part as my invention; but What I do claim, and desire to secure by Letters Patent, is—

The arrangement of the knives in pairs on the periphery of the revolving cylinder, with their edges radiating from the center of the cylinder, so as to operate the same as shears in passing between the knives of the hollow cylinder, when constructed as and for the purpose herein set forth.

JACOB K. HOYER.

Witnesses:
 G. S. KINSEY,
 GEORGE PRINTZ.